United States Patent [19]
Koval et al.

[11] Patent Number: 5,441,173
[45] Date of Patent: Aug. 15, 1995

[54] PISTON DEPOSITOR

[75] Inventors: Michael J. Koval, Ballwin; Richard M. Silzer, Chesterfield; William M. Hasse, St. Charles; Michael E. Leiweke, Arnold, all of Mo.

[73] Assignee: Continental Baking Company, St. Louis, Mo.

[21] Appl. No.: 205,204

[22] Filed: Mar. 2, 1994

[51] Int. Cl.⁶ .............................................. B67D 5/52
[52] U.S. Cl. .................... 222/63; 222/276; 222/309
[58] Field of Search ............... 222/63, 275, 276, 309, 222/380

[56] References Cited

U.S. PATENT DOCUMENTS

| | | | |
|---|---|---|---|
| 2,032,163 | 2/1936 | Bagby | 222/309 X |
| 2,245,287 | 6/1941 | Minard | 222/309 X |
| 2,538,346 | 1/1951 | Wood . | |
| 3,863,422 | 2/1975 | Wagner . | |
| 4,008,829 | 2/1977 | Chandra et al. | 222/63 |
| 4,155,691 | 5/1979 | Ridgeway et al. . | |
| 4,234,107 | 11/1980 | Gernlein | 222/309 |
| 4,254,806 | 3/1981 | Elsworth | 222/380 X |
| 4,566,612 | 1/1986 | von Kreuter | 222/309 |
| 4,900,241 | 2/1990 | Sigurdsson . | |
| 4,923,706 | 5/1990 | Binley et al. . | |
| 5,007,819 | 4/1991 | Anderson . | |
| 5,080,148 | 1/1992 | Florida | 222/309 X |
| 5,100,685 | 3/1992 | Belshaw et al. . | |
| 5,127,547 | 7/1992 | Gerich | 222/63 X |
| 5,227,186 | 7/1993 | Belshaw . | |
| 5,232,713 | 8/1993 | Morikawa et al. . | |
| 5,266,341 | 11/1993 | Morikawa et al. . | |

*Primary Examiner*—Andres Kashnikow
*Assistant Examiner*—Kenneth Bomberg
*Attorney, Agent, or Firm*—Price, Heneveld, Cooper, DeWitt & Litton

[57] ABSTRACT

A piston depositor for depositing batter and the like into pans in an automated bakery line includes a valve housing which defines an inlet, a valve chamber, an outlet and a cylinder bore which intersects the valve chamber. A rotary valve is disposed within the valve chamber. The rotary valve selectively interconnects the bore with the valve housing inlet and the valve housing outlet. A piston and rod assembly is slideably disposed within the bore. A programmable drive system including servomotors controls the operation of the rotary valve and piston and rod assembly to intake batter through the housing inlet and discharge the batter through the valve housing outlet.

19 Claims, 5 Drawing Sheets

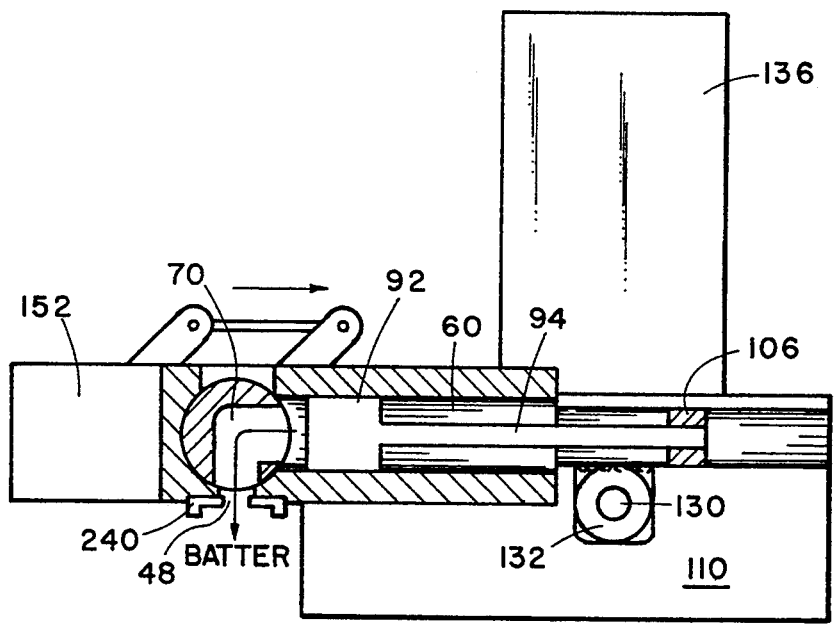
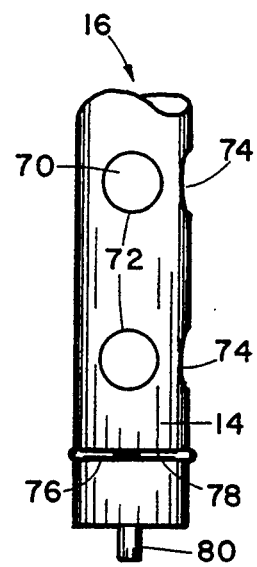
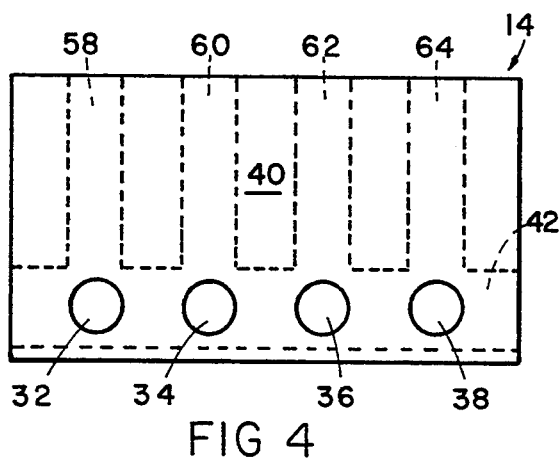
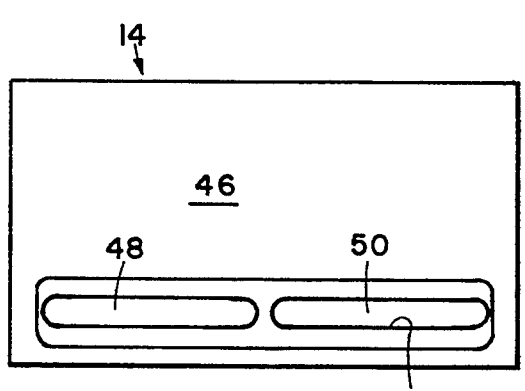
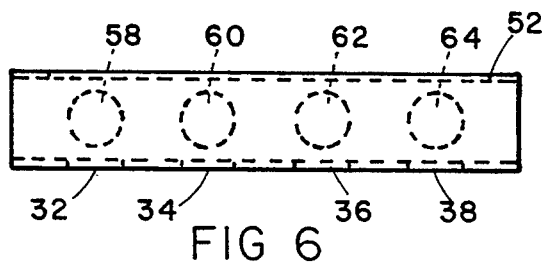
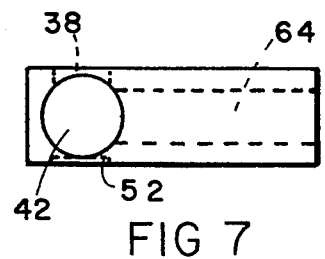

PISTON DEPOSITOR

BACKGROUND OF THE INVENTION

The present invention relates to bakery equipment and, more particularly, to a batter depositor for an automated bakery system.

Automated bakery systems may include a belt conveyor which transports pans past a batter deposit station. A flowable batter, for example, may be held in a hopper located at the deposit station. A depositor controls flow of batter from the hopper to pans stepped past the deposit station on the conveyor. The pans are filled to the proper level with the batter and stepped down the conveyor to subsequent operations, such as past a crumb depositor, until the pans are delivered to an oven. After the product is properly baked, it is removed from the pans. The pans are cleaned and reloaded at the entrance end of the system.

Accurate control of the quantity or scaling weight of batter deposited in the pans is important to efficient and cost effective operation of the systems. Variations in the amount of batter deposited in the pans will have an effect on ultimate product quality and product uniformity. In large scale automated bakery operations, such weight variations can have a significant effect on costs and ultimate profitability.

Currently available batter depositors include a hopper, a rotary valve and a piston which is moved through intake and deposit strokes in timed relationship with movement of the rotary valve. With a rotary valve in a first position wherein the hopper will communicate with a piston cylinder, the piston may be drawn through its intake stroke. The valve is then rotated to cutoff flow of batter into the cylinder and to place the cylinder into communication with an outlet or discharge opening. The piston may then be moved through its discharge stroke depositing batter into a pan positioned below the depositor. Proper timing in the operation of the valve and piston drive is critical to proper operation of the depositor. The scaling weight or amount of batter deposited by the device is controlled by the piston intake stroke and by the timing of the positioning of the valve. Rotation of the valve to the discharge position cuts off communication with or flow of the batter to the cylinder.

Available systems employ pneumatic piston/cylinder actuators to control the rotary motion of the valve as well as to reciprocate the piston. Such systems have difficulty in maintaining deposit weight within close tolerances. Problems are experienced due to variations in the plant air systems. Pressure fluctuations can have an adverse effect on the depositor timing, the speed or rotation of the valve and the speed of the piston in both the intake and discharge strokes. Difficulties are also experienced with maintenance of such items due to the line pressures, seal leaks in the actuators and the like. Proper operation requires constant operator interface. A need exists for an improved depositor which is reliable in operation and which accurately controls scaling weight and other operating parameters.

SUMMARY OF THE INVENTION

In accordance with the present invention, the aforementioned need is substantially met. Essentially, a batter depositor is provided including a valve housing, a rotary valve and a piston. A programmable piston drive and a programmable rotary valve drive are also provided. The drives permit effective control over the system parameters and operation. Variations can be achieved in the speed of the piston and over the length of intake stroke to control deposit weights. In addition, the rotary valve positioning, timing and speed may be accurately controlled.

In a presently preferred form, programmable servomotors are used to operate the valve and the piston. The valve drive includes a servomotor having a rotary output shaft connected to a valve crank arrangement through a precision gearhead or reduction gearbox. The piston drive includes a programmable servomotor which drives a rack and pinion subassembly through another precision gearhead or reduction gearbox. Accurate timing in the operation of the valve and piston is achievable. Variations, due to plant configurations, in the quality of the output and consistency of the output of the depositor are eliminated. Control over deposit weights, set parameters, speeds and the like are readily achieved. A versatile depositor which is adapted to a wide variety of bakery products is obtained.

BRIEF DESCRIPTION OF THE DRAWINGS

FIG. 3 is another cross-sectional view also taken generally along line II—II of FIG. 1 with the valve shown in the deposit position;

FIG. 4 is a top view of a valve housing incorporated in the present invention;

FIG. 5 is a bottom view of the valve housing;

FIG. 6 is a rear view of the valve housing;

FIG. 7 is an end, elevational view of the valve housing;

FIG. 8 is a fragmentary, enlarged view of the rotary valve;

DETAILED DESCRIPTION OF THE PREFERRED EMBODIMENT

Figure 1:
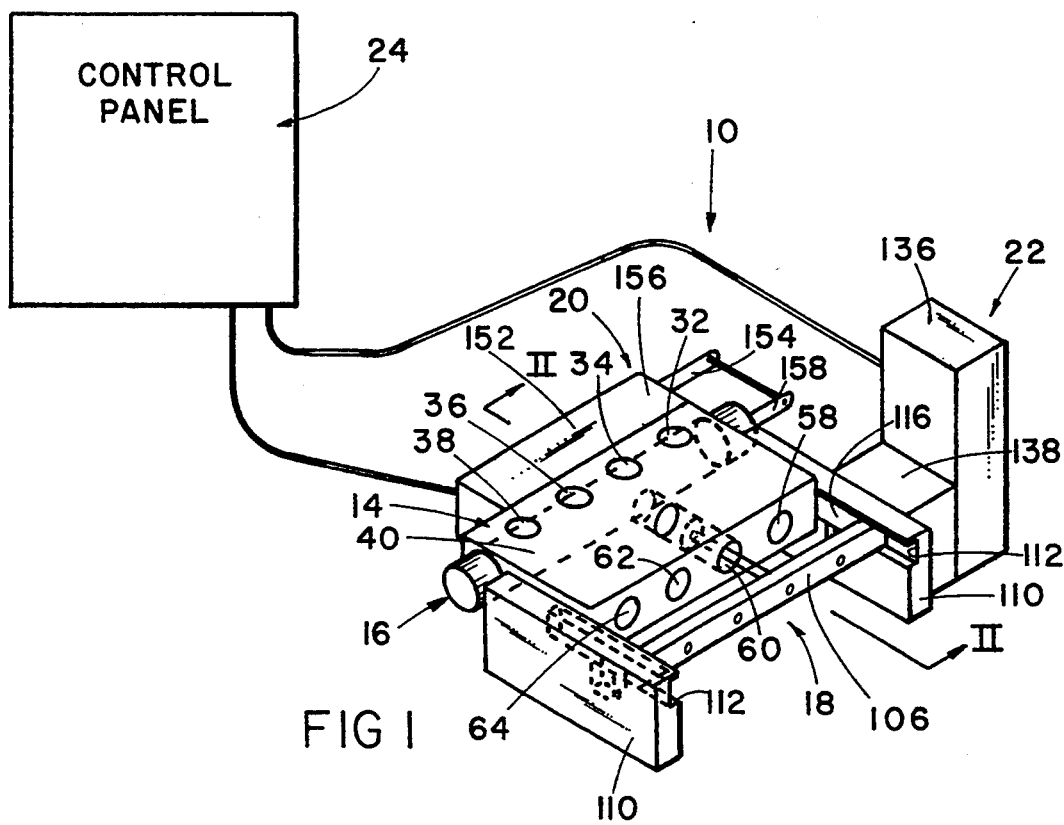
FIG. 1 is a perspective view of a piston depositor in accordance with the present invention.
Figure 2:
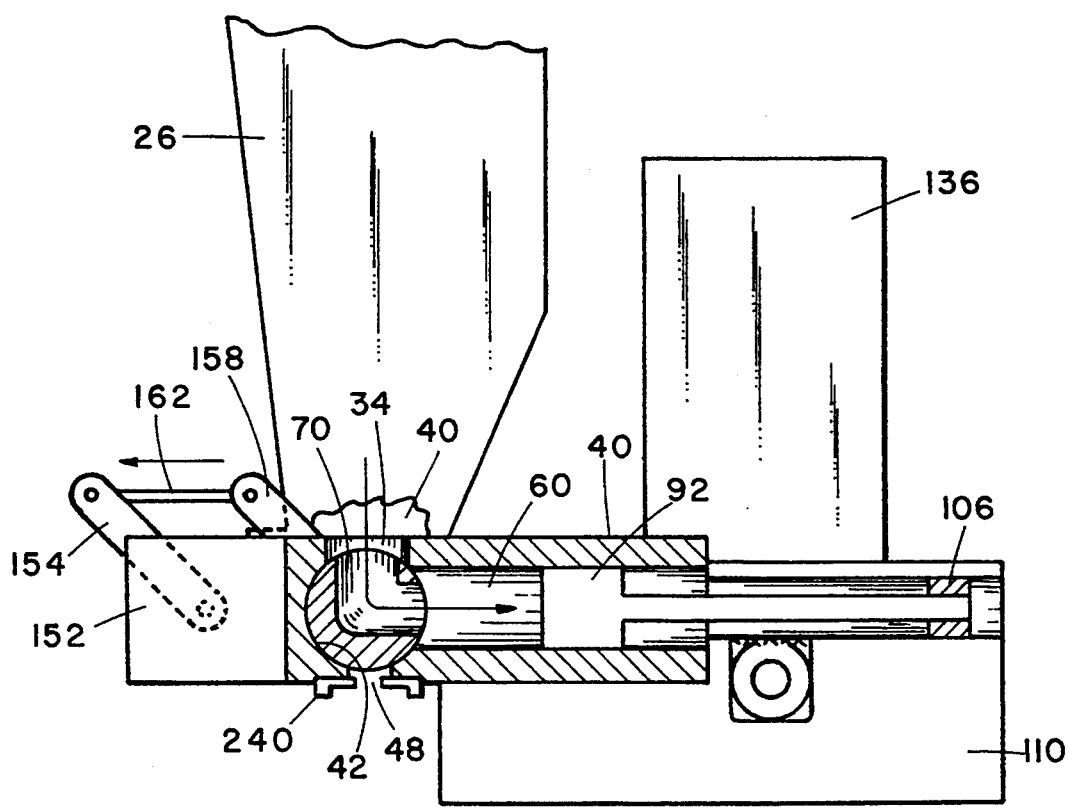
FIG. 2 is an enlarged, cross-sectional view taken generally along line II—II of FIG. 1 with a rotary valve incorporated therein shown in the intake position.
Figure 11:
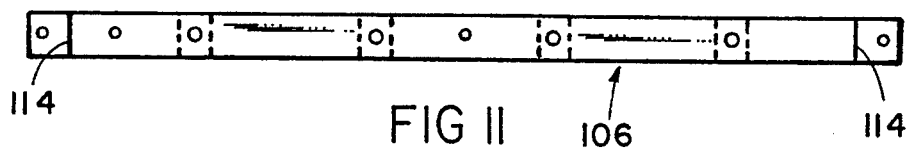
FIG. 11 is a top view of a piston rod connecting bar incorporated in the present invention.
Figure 12:
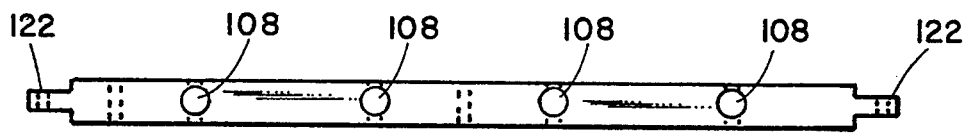
FIG 12 is an elevational view of the bar of FIG. 11.

A piston depositor in accordance with the present invention is illustrated in FIGS. 1, 2 and 3 and generally designated by the numeral 10. Depositor 10 includes a valve housing 14, a rotary valve 16, a piston and piston drive assembly 18, a valve drive motor subassembly 20 and a piston drive motor subassembly 22. Motors 20, 22 are electrically interconnected and controlled through a system which includes a panel 24.

Depositor 10 is adapted for use with a flowable or pourable batter. As seen in FIG. 2, a hopper 26 for the batter is mounted on valve housing 14. Valve housing 14, as seen in FIGS. 2-7, is generally rectangular in configuration. The housing defines a series of generally circular inlets 32, 34, 36 and 38 in a top surface 14. Hopper 26 defines an outlet 40 aligned with the inlets. The inlets intersect an enlarged cylindrical valve chamber 42. A lower surface 46 of housing 14 defines spaced outlets 48, 50. Outlets 48, 50 open through a generally rectangular recess 52 formed in the lower surface of the valve housing. A plurality of cylindrical bores 58, 60, 62 and 64 extend perpendicular to valve chamber 42.

Rotary valve 16, as seen in FIGS. 2, 3 and 8, is an elongated, cylindrical member which defines a plurality of generally L-shaped passages 70. Each passage 70 includes a circular inlet 72 which communicates with an outlet 74. Valve 14 further includes grooves 76 adjacent each end for receiving an O-ring seal 78. A coupler shaft 80 extends from an end of the rotary valve. Valve 16 is rotatable within valve chamber 42. Valve passages 70 are alignable with the valve housing inlets 32, 34, 36 and 38 and the cylinder bores 58, 60, 62 and 64.

Figure 9:
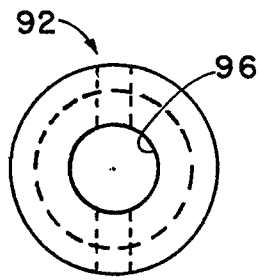
FIG. 9 is an enlarged, rear view of the piston incorporated in the present invention.
Figure 10:
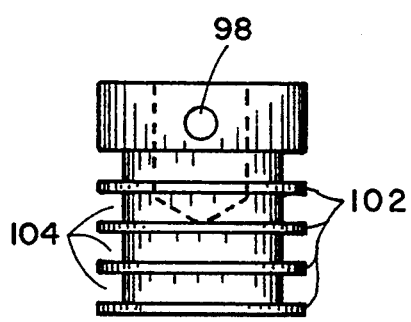
FIG. 10 is an elevational view of the piston of FIG. 9.

A piston subassembly is disposed within each of the bores 58, 60, 62 and 64. For simplicity sake, only one piston subassembly is illustrated in FIG. 1. Each subassembly includes a piston 92 attached to a piston rod 94. As shown in FIGS. 9 and 10, piston 92 defines a connecting bore 96 intersected by a cross bore 98. Rod 94 extends into bore 96 and is attached thereto by a suitable pin extending through bore 98. The piston defines a series of sealing flanges or rings 102 separated by grooves 104. The piston is preferably fabricated from a UHMW plastic material.

Each piston rod 94 is connected to a cross rod or connecting bar 106. Bar 106 defines a plurality of spaced rod bores 108. Rods 94 are secured to bar 106 by suitable pins or fasteners at bores 108. Connecting bar 106 is supported in side plates or support frame members 110 which extend alongside of the valve housing 14. Supports 110 define grooves or guideways 112. Each end 114 of connecting bar 106 is secured to a rack 116, which is slideably positioned within one of the guideways 112.

Figure 13:
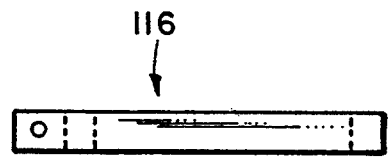
FIG. 13 is a top view of a piston drive rack incorporated in the present invention.
Figure 14:
FIG. 14 is a elevational view of the rack of FIG. 13.
Figure 15:
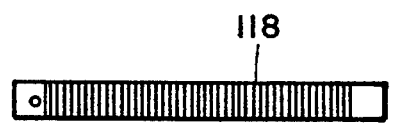
FIG. 15 is a bottom view of the rack of FIG. 13.

As seen in FIGS. 13-15, each rack 116 defines a plurality of gear teeth 118 and a notched connector end 120. Connector tabs 122 at the ends 114 of bar 106 slip into notches 120, and the bar is connected to the rack by a suitable fastener. Racks 116 and connecting bar 106 are reciprocated on supports 110 by drive subassembly 22. The drive subassembly includes a shaft 130 which extends between supports 110 and is rotatably mounted thereon by suitable bearings. Pinion gears 132 are secured to shaft 130 at each end thereof and in a position to engage the racks 116. Shaft 130 and the pinions are alternately rotated to reciprocate connecting bar 106 and, hence, move pistons 92 through their intake and deposit cycle. Drive 22 further includes a servomotor 136. Servomotor 136 has an output shaft coupled to a gearhead or reduction gearbox 138. An output shaft from gearbox 138 is coupled to shaft 130.

Valve 16 is moveable from a first position, shown in FIG. 2, wherein valve passages 70 connect each of the cylinder bores with the batter hopper through the inlets. Rotation of the valve through an angle of 45-degrees will move passages 70 to a discharge or deposit position, as shown in FIG. 3. When in the discharge position, the cylinders are placed in communication with discharge openings or outlets 48, 50 of the valve housing. The valve is rotated between these two positions by a servomotor 152. Servomotor 152 includes an output shaft which is connected to a crank arm 154 through a gearhead or reduction gearbox 156. A second crank arm 158 is nonrotatably connected to the coupler 80 on the end of valve 16. Cranks 154, 158 are connected by a connecting rod 162.

When valve drive subassembly 20 positions the cranks 154, 158 as shown in FIG. 2, the valve is in the intake position. Piston drive subassembly 22 can then shift connecting bar 106 and pistons 92 to the right, as viewed in FIG. 2, through the length of an intake stroke. Batter will flow from hopper 26 through the inlets in the housing and the valve passages to fill the individual piston cylinders 58, 60, 62 and 64. Servomotor 152 is actuated to rotate cranks 154, 158 to the position shown in FIG. 3. Valve 16 is now positioned so that inlets 72 are aligned with the cylinders, and outlets 74 are aligned with the valve housing outlets 48, 50. Servomotor 136 is then actuated to shift pistons 92 towards valve 16 on their discharge stroke, thereby forcing the batter from the cylinders and through the discharge openings to bakery pans positioned below the valve housing.

Figure 18:
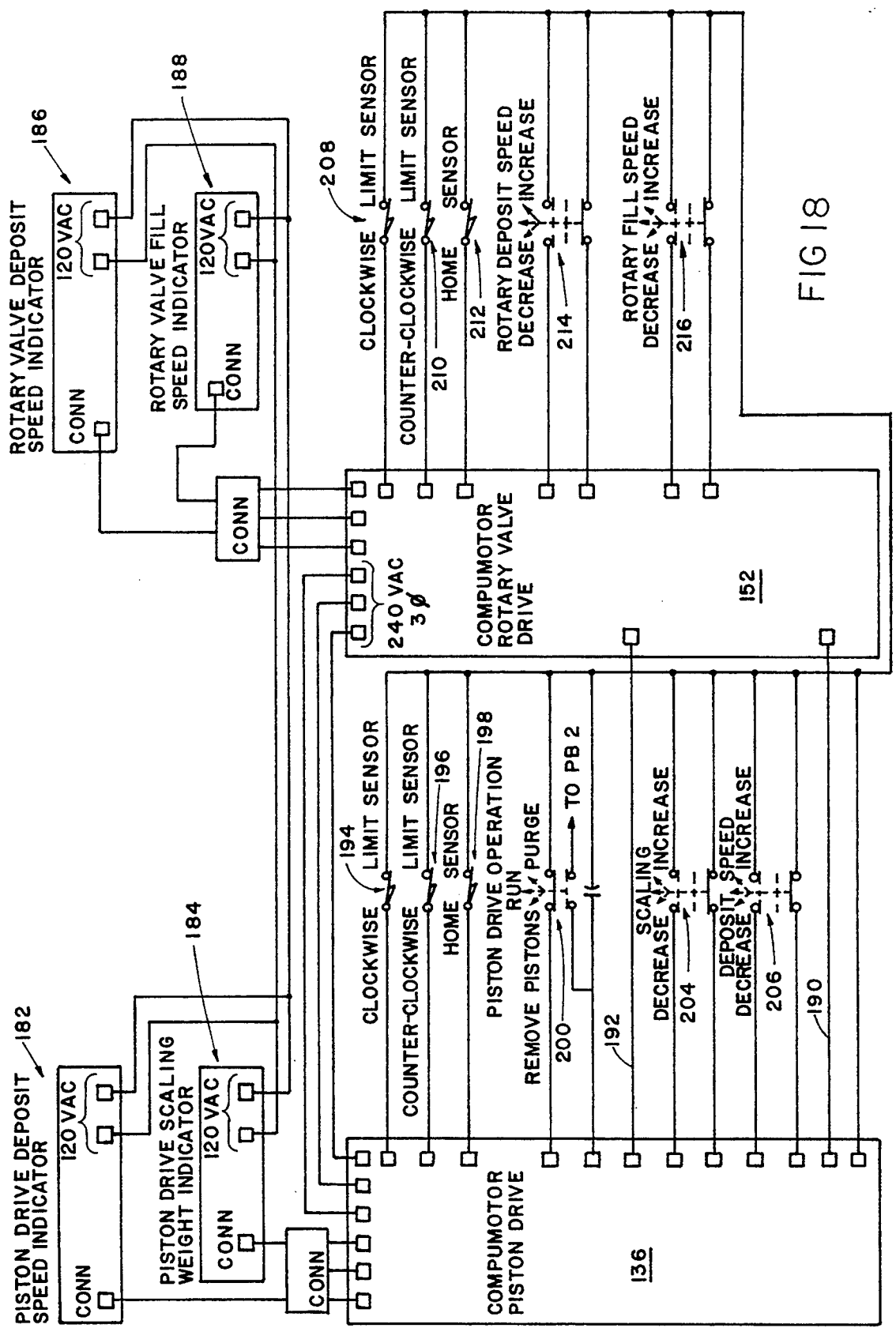
FIG. 18 is an electrical schematic of the drive motors and control system incorporated in the present invention.
Figure 19:
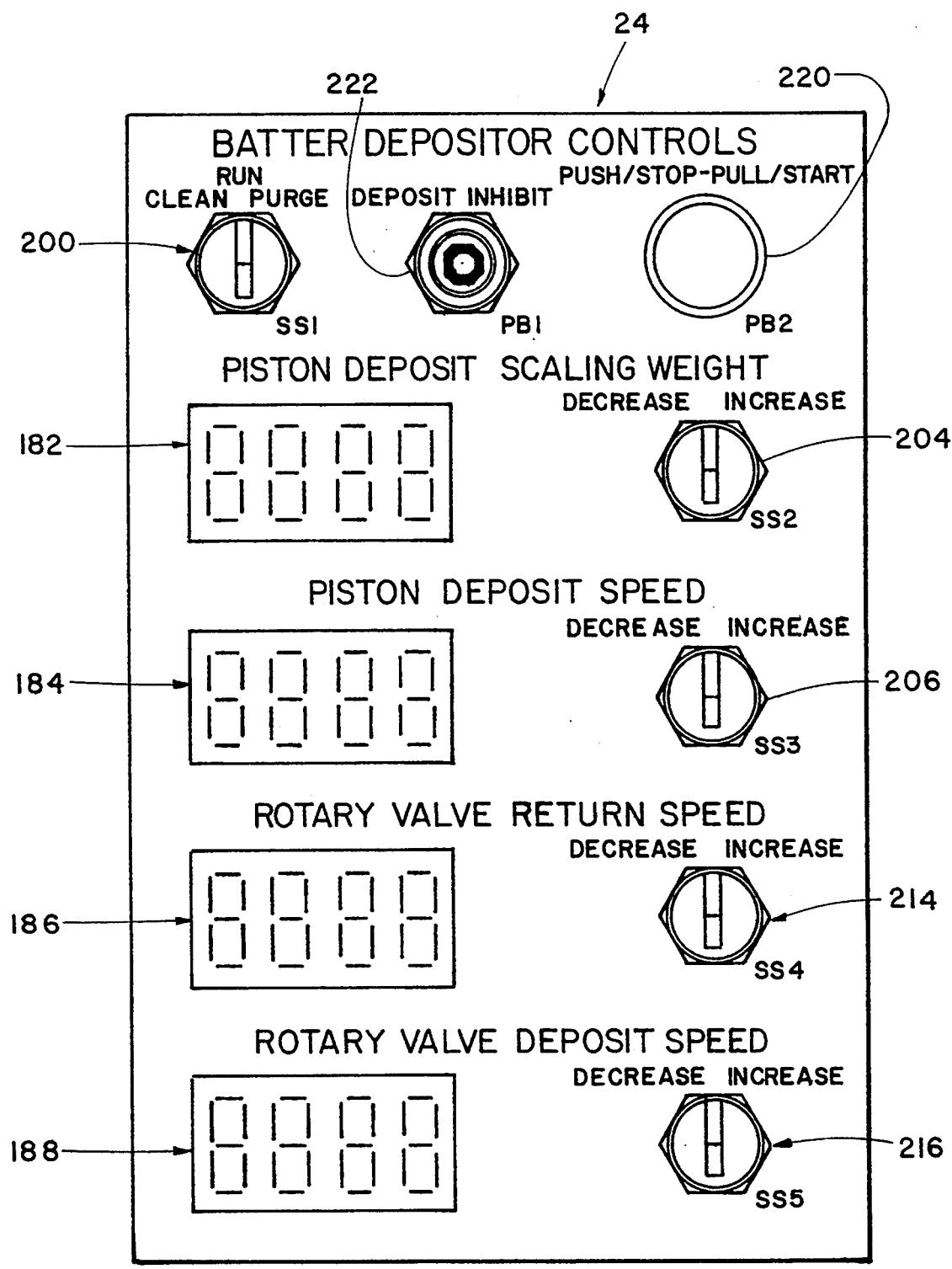
FIG. 19 is a view of the control panel for the depositor.

The servomotors 136, 152 are operated through a control system, as schematically illustrated in FIGS. 18 and 19. The control system includes a piston drive deposit speed indicator 182 having a digital output on panel 24. The system also includes a piston drive scaling weight indicator 184. The scaling weight indicator provides an indication of the intake stroke length for each of the pistons. The control system further includes a rotary valve return speed indicator 186 and a rotary valve fill speed indicator 188. The indicators show the speed of rotation of the valve between the first and second position and the second and first position. Servomotors 136, 152 are electrically inter-connected through electrical lines 190, 192. The interconnection controls the timing of servomotor operation. Servomotor 136 cannot drive the pistons to discharge batter unless the valve is in the discharge position.

The electrical system further includes limit sensors 194, 196 which sense the clockwise and counterclockwise rotational limits of pinion gears 132. The system further includes a home sensor 198. The sensors prevent driving of the pistons against the end of their cylinders or full retraction out of their cylinders. A three-position piston drive switch 200 is mounted on panel 24 and connected to servomotor 136. As shown in FIG. 19, switch 200 is moveable between run, purge and clean positions. When in the clean position, the piston bar is moved back a specified amount of steps to permit the pistons to be removed from their cylinder bores for cleaning purposes. When in the center run position, the servomotor is allowed to run the specified programs for deposit operation. When in the purge position, the system may be cycled manually. The system further includes three-position switches 204, 206 which set the piston scaling weight or stroke length and the return stroke or piston deposit speed. Each of the switches is moveable to an "increase" position or a "decrease" position. The valves selected will step up or down on indicators 182, 184. When in the center or neutral position, the selected valves are run to operate servomotor 136.

The electrical controls for the rotary valve drive servomotor 152 are similar. The system includes clockwise and counterclockwise limit sensors 208, 210 and a home sensor 212. The sensors control the maximum angular rotation of the valve. Three-position switches 214, 216 provide control over the rotary valve return speed (rotation from the deposit position to the fill position) and the rotary valve deposit speed (rotation from the fill position to the deposit position), respectively. The control system, as seen in FIG. 19, further includes a main power/emergency stop switch 220 and a depositor inhibitor switch 222. Inhibitor switch 222 will start and stop the depositor allowing the bakery conveyor and other apparatus to run if needed. The main switch 222 allows the operator to stop the depositing system immediately for emergency situations or shutdowns.

In a currently existing embodiment of the subject invention, piston drive servomotor 136 is a programmable, brushless, three-phase AC motor sold by Parker under the designation Compumotor and model or part number ZX920-240V-25. Rotary valve servomotor 152 is a programmable, brushless, three-phase AC motor sold by Parker under the Compumotor designation as model or part number ZX610-240V-25. Gearhead 138 is a right angle, planetary gearhead which provides high efficiency, high torque and low backlash. Positioning of racks 116 is achieved through the gearhead. It is presently preferred that the gearhead be of the type sold by Bayside Controls Inc., Port Washington, N.Y., under the model number RA 142 and which provides a five to one reduction ratio. The gearbox is a high precision, zero degree backlash device. Similarly, the gearhead or reduction gearbox 156, which connects servomotor 152 to output crank 154, is a high precision, zero degree backlash device. In the presently existing embodiment, the gearhead is of the type sold by Bayside Controls Inc. under the model number PG 90 and which has a ten to one reduction ratio.

Figure 16:
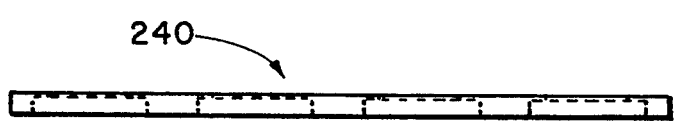
FIG. 16 is a side view of a product die which may be used with the depositor.
Figure 17:
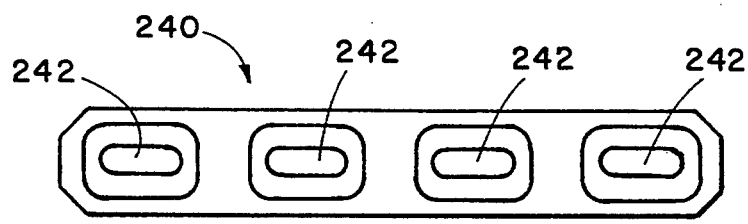
FIG. 17 is a bottom view of the die of FIG. 16.

The programmable, servomotor control over the positioning of rotary valve 16 and piston bar 106 provides the bakery operator with precise and accurate control of scaling weight and deposit speed. The programmable motors are electrically interconnected so that proper timing of operation is achieved. Cutoff of batter into the cylinders is controlled by rotation of the valve to the deposit position shown in FIG. 3. Control of the amount of batter is achieved, therefore, through the timing of the valve rotation as well as the length of the piston stroke. Once the valve is in the position shown in FIG. 3, servomotor 136 will operate to shift the pistons through the discharge stroke. The pistons force the batter through the valve passages 70 and through a suitable product die 240 secured at the discharge outlets 48, 50 within recess 52 of the valve housing. In one form, product die 240 defines four rectangular outlets 242. The die, as shown in FIGS. 16 and 17, can produce a "carpet" of batter in an elongated muffin pan, for example. The depositor will lay the batter flat in the pan. Such is achieved through controlling of the timing of rotation of valve 16 in conjunction with movement of the pistons and stepwise movement of the pan conveyor.

Problems heretofore experienced with achieving close tolerances over scaling weights or deposit weights of batter are eliminated. Variations in product output caused by plant air pressure fluctuations and the like are eliminated. Maintenance associated with pneumatic actuators and pressurized air systems is also eliminated.

The operator is given significant control over the operating parameters of the depositor. These parameters are readily selected on the provided control panel. The system has significantly improved reliability and reduced maintenance. The system ensures an overall increase in plant profitability through a reduction in product costs from proper control of batter deposit weights.

In view of the above description, those of ordinary skill in the art may envision various modifications which would not depart from the inventive concepts disclosed herein. The above should, therefore, be considered as only a description of the preferred embodiment. The true spirit and scope of the present invention may be determined by reference to the appended claims.

The embodiments of the invention in which an exclusive property or privilege is claimed are defined as follows:

1. A piston depositor, comprising:
   a rotary valve housing defining at least one housing inlet, a valve chamber, at least one housing outlet and at least one piston bore intersecting said valve chamber;
   a hopper on said valve housing, said hopper having a hopper outlet connected to said valve housing inlet;
   a rotary valve disposed within said valve chamber, said valve being rotatable between a first position connecting said housing inlet with said piston bore and a second position connecting said piston bore with said housing outlet;
   at least one piston slideably disposed within said at least one piston bore;
   a rotary valve drive including a programmable valve servomotor connected to said valve for rotating said valve between said first and said second positions;
   a programmable piston drive including a piston servomotor operatively connected to said piston for moving said piston through a fill stroke when said valve is in said first position and for moving said piston through a deposit stroke when said valve is in said second position; and
   an electrical control system operatively connected to said valve drive and said piston drive for controlling the operation and timing of said each of said drives, said control system providing control of the length of the piston fill stroke and the speed of rotation of said rotary valve.

2. A piston depositor as defined by claim 1 wherein said piston drive comprises:
   a rod connected to said piston;
   a support frame; and
   a connecting bar connected to said rod and slideably mounted on said support frame.

3. A drive system for a piston depositor of the type including a rotary valve for selectively connecting a cylindrical bore with a product source and a deposit outlet and a piston within said bore, said drive system comprising:
   a piston drive servomotor;
   a piston drive subassembly for connecting said piston drive servomotor to the piston to drive said piston through variable fill and deposit strokes;
   a rotary valve servomotor;
   a valve drive subassembly for connecting said rotary valve servomotor to the rotary valve for rotating the valve between fill and deposit positions; and a control operatively connected to said piston drive servomotor and said valve servomotor for programmably controlling the operation of said servomotors whereby the operation of the depositor may be accurately controlled, said piston drive subassembly comprising:

a support frame;

a connecting bar slideably mounted on said support frame, said bar being connectable to the piston of the depositor;

a rack supported on said support frame and connected to said bar; and a pinion operatively connected to said piston servomotor and engaging said rack whereby alternate rotation of said pinion will control the direction and speed of the movement of the piston and the length of the fill stroke and deposit stroke when the bar is mounted to the piston of the depositor.

4. A piston depositor, comprising:

a rotary valve housing defining at least one housing inlet, a valve chamber, at least one, housing outlet and at least one piston bore intersecting said valve chamber;

a hopper on said valve housing, said hopper having a hopper outlet connected to said valve housing inlet;

a rotary valve disposed within said valve chamber, said valve being rotatable between a first position connecting said housing inlet with said piston bore and a second position connecting said piston bore with said housing outlet;

at least one piston slideably disposed within said at least one piston bore;

a rotary valve drive connected to said valve for rotating said valve between said first and said second positions;

a programmable piston drive operatively connected to said piston for moving said piston through a fill stroke when said valve is in said first position and for moving said piston through a deposit stroke when said valve is in said second position; and a control system operatively connected to said valve drive and said piston drive for controlling the operation and timing of said each of said drives, said piston drive comprising a rod connected to said piston;

a support frame;

a connecting bar connected to said rod and slideably mounted on said support frame;

a piston servomotor;

a rack fixed to said connecting bar; and a pinion on said support, said pinion being drivingly connected to said servomotor.

5. A piston depositor as defined by claim 4 wherein said piston drive comprises a gearbox connected to said servomotor and said pinion.

6. A piston depositor as defined by claim 1 wherein said rotary valve drive comprises:

a valve drive connector for connecting said valve servomotor to said rotary valve.

7. A piston depositor as defined by claim 6 wherein said valve housing defines a plurality of inlets and a plurality of piston bores intersecting said valve chamber.

8. A piston depositor as defined by claim 7 further including a plurality of pistons, each piston being disposed within one of said plurality of piston bores.

9. A piston depositor as defined by claim 8 wherein said rotary valve defines a generally L-shaped valve passage.

10. A piston depositor as defined by claim 9 wherein said piston drive comprises:

a rod connected to said piston;

a support frame; and a connecting bar connected to said rod and slideably mounted on said support frame.

11. A drive system as defined by claim 3 wherein said piston drive subassembly further includes a gearbox operatively connecting said piston servomotor and said pinion.

12. A piston depositor, comprising:

a rotary valve housing defining at least one housing inlet, a valve chamber, at least one housing outlet and at least one piston bore intersecting said valve chamber;

a hopper on said valve housing, said hopper having a hopper outlet connected to said valve housing inlet;

a rotary valve disposed within said valve chamber, said valve being rotatable between a first position connecting said housing inlet with said piston bore and a second position connecting said piston bore with said housing outlet;

at least one piston slideably disposed within said at least one piston bore;

a rotary valve drive connected to said valve for rotating said valve between said first and said second positions;

a programmable piston drive operatively connected to said piston for moving said piston through a fill stroke when said valve is in said first position and for moving said piston through a deposit stroke when said valve is in said second position; and a control system operatively connected to said valve drive and said piston drive for controlling the operation and timing of said each of said drives, said rotary valve drive comprising:

a programmable valve servomotor; and a valve drive connector for connecting said valve servomotor to said rotary valve, said valve housing defining a plurality of housing inlets and a plurality of piston bores intersecting said valve chamber, and wherein said piston depositor further includes a plurality of pistons, each piston being disposed within one of said plurality of piston bores, said rotary valve defining a generally L-shaped valve passage, and wherein said piston drive comprises:

a rod connected to said pistons;

a support frame;

a connecting bar connected to said rod and slideably mounted on said support frame;

a piston servomotor;

a rack fixed to said connecting bar; and a pinion on said support, said pinion being drivingly connected to said servomotor.

13. A piston depositor as defined by claim 12 wherein said piston drive comprises a gearbox connected to said servomotor and said pinion.

14. A drive system for a piston depositor of the type including a rotary valve for selectively connecting a cylindrical bore with a product source and a deposit outlet and a piston within said bore, said drive system comprising:

a piston drive servomotor;

a piston drive subassembly for connecting said piston drive servomotor to the piston to drive said piston through variable fill and deposit strokes;

a rotary valve servomotor;

a valve drive subassembly for connecting said rotary valve servomotor to the rotary valve for rotating the valve between fill and deposit positions; and a control operatively connected to said piston drive servomotor and said valve servomotor for programmably controlling the operation of said servomotors whereby the operation of the depositor, including the length of the fill and deposit strokes of the piston and the speed of rotation of the rotary valve, may be accurately controlled.

15. A drive system as defined by claim 14 wherein said piston drive subassembly comprises:

a support frame; and a connecting bar slideably mounted on said support frame, said bar being connectable to the piston of the depositor.

16. A drive system for a piston depositor of the type including a rotary valve for selectively connecting a cylindrical bore with a product source and a deposit outlet and a piston within said bore, said drive system comprising:

a piston drive servomotor;

a piston drive subassembly for connecting said piston drive servomotor to the piston to drive said piston through variable fill and deposit strokes;

a rotary valve servomotor a valve drive subassembly for connecting said rotary valve servomotor to the rotary valve for rotating the valve between fill and deposit positions; and a control operatively connected to said piston drive servomotor and said valve servomotor for programmably controlling the operation of said servomotors whereby the operation of the depositor may be accurately controlled, and wherein said valve drive subassembly comprises:

a first crank arm connectable to said valve servomotor;

a second crank arm connectable to the rotary valve; and a connecting rod connecting said first and second crank arms.

17. A drive system as defined by claim 16 wherein said piston drive subassembly comprises:

a support frame.; and a connecting bar slideably mounted on said support frame, said bar being connectable to said piston.

18. A drive system as defined by claim 17 wherein said piston drive subassembly further comprises:

a rack supported on said support frame and connected to said bar; and a pinion operatively connected to said piston servomotor and engaging said rack whereby rotation of said pinion in opposite directions will control the direction and speed of the movement of the piston and the length of the fill stroke and deposit stroke when the bar is connected to the piston of the depositor.

19. A drive system as defined by claim 18 wherein said piston drive subassembly further includes a gearbox operatively connecting said piston servomotor and said pinion.

* * * * *